| United States Patent [19] | [11] Patent Number: 4,987,496 |
|---|---|
| Greivenkamp, Jr. | [45] Date of Patent: Jan. 22, 1991 |

[54] SYSTEM FOR SCANNING HALFTONED IMAGES

[75] Inventor: John E. Greivenkamp, Jr., Rochester, N.Y.

[73] Assignee: Eastman Kodak Company, Rochester, N.Y.

[21] Appl. No.: 408,819

[22] Filed: Sep. 18, 1989

[51] Int. Cl.$^5$ .............................................. H04N 1/40
[52] U.S. Cl. .................................. 358/448; 358/454; 358/456; 358/458
[58] Field of Search ............... 358/429, 448, 454, 455, 358/456, 457, 458, 459, 461, 463, 464, 465, 467, 55; 350/401, 379, 404

[56] References Cited

U.S. PATENT DOCUMENTS

| 3,588,224 | 6/1971 | Pritchard | 350/157 |
| 4,515,193 | 3/1986 | Greivenkamp, Jr. | 350/401 |
| 4,616,266 | 10/1986 | Hennig | 358/280 |

OTHER PUBLICATIONS

Joseph Shou-Pyng Shu et al., "Moire Factors and Visibility in Scanned and Printed Halftone Images," *Optical Engineering*, Jul. 1989, vol. 28, No. 7, pp. 805-812.

Yao-Ming Chao, "An Investigation Into the Coding of Halftone Pictures", D.Sc. Thesis, Massachusetts Institute of Technology (1982).

"Reduced Moire-Effect Charge Coupled Device", *IBM Tech. Disc. Bull.*, vol. 20, No. 9, Feb. 78, pp. 3752-55.

*Primary Examiner*—Edward L. Coles, Sr.
*Assistant Examiner*—Jerome Grant, II
*Attorney, Agent, or Firm*—Thomas H. Close

[57] ABSTRACT

A process for scanning halftoned images with a sampled or electronic imaging system includes the steps of first optically low-pass filtering the scene, then oversampling the scene at a rate several times that required for display bandwidth, and finally putting the resulting data through an electronic or digital low-pass filter/resampling operation to reduce the system data load. The oversampling advantageously shifts unwanted aliasing between the halftone and sampling frequencies to frequencies above the display bandwidth, so that the aliasing may then be filtered out without affecting signals within the bandwidth of the display.

5 Claims, 11 Drawing Sheets

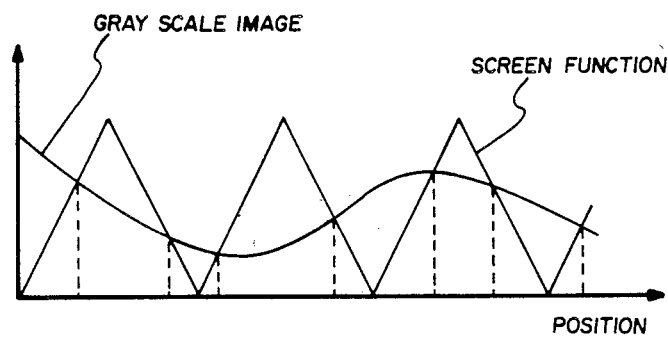
FIG. IA
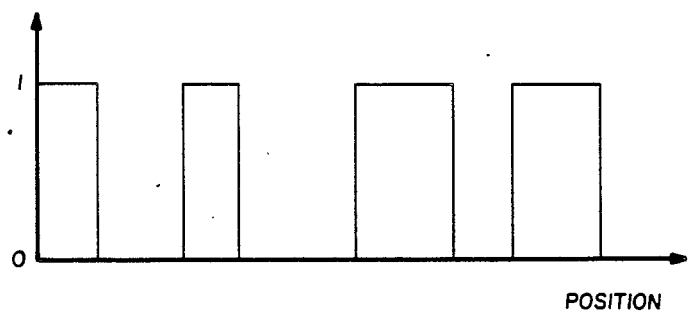
FIG. IB

Ilustrates the sinc function;

SYSTEM FOR SCANNING HALFTONED IMAGES

BACKGROUND OF THE INVENTION

The use of halftoned image as the input for a sampled or electronic imaging system can create severe problems in producing a final image that is not degraded by aliasing artifacts. The nature of the problem is that the halftoning process introduces high spatial frequencies into the image to be scanned that are not present in the original scene. The difficulty is generally not the aliasing of scene information, but rather the aliasing of the halftone dots. An additional complication is that since the original halftoned image can come from a variety of sources for the same scanner, the halftone frequency is not known, and the system must therefore be capable of handling an arbitrary input halftone frequency and orientation. The problem therefore is how to eliminate aliasing artifacts due to the interaction of the halftone dots and the sampling grid, while keeping the amount of data that must be collected, stored, and transmitted to a minimum.

THE HALFTONED IMAGE

Halftone image processing techniques are well-known, such as those described in Yao-Ming Chao, "An Investigation Into the Coding of Halftone Pictures," D.Sc. Thesis, Massachusetts Institute of Technology (1982); J.E. Greivenkamp, Jr., U.S. Pat. No. 4,575,193; D. H. Pritchard, U.S. Pat. No. 3,588,224; E. Hennig, U.S. Pat. No. 4,616,266; and Shu et al., "Moire Factors and Visibility in Scanned and Printed Halftone Images," *Optical Engineering*. Vol. 28 No. 7, July 1989, pages 805–812. Most of Chao's work involves the development of computer algorithms to determine the dot spacing, orientation and shape so that an appropriate and adaptive filter or average is applied to the image prior to scanning. One filter is designed so that it has zero's at all the harmonics of the halftone frequencies. It appears that a "high quality" version of the halftone must be available to the algorithm for this determination (i.e. it must be able to resolve dots). This would seem to require that a high-resolution pre-scan of the halftone be made prior to the actual scan. This requirement would make it difficult to implement this approach in a practical system.

The simplest representation of a halftoned image is one in which the image consists of an array of delta functions with the height of each delta function corresponding to the value of each individual sample--Point Intensity Modulation. The expressions for the halftoned image and its spectrum are $$i_H(x,y) = o(x,y) \text{ comb } x/x_H, y/y_H) \quad (1)$$

$$I_H(\xi, \eta), = O(\xi, \eta) ** \text{comb}(X_H\xi, Y_H v), \quad (2)$$

where $x_H$ and $y_H$ are the sample spacings for the halftone process, $o(x,y)$ represents the scene, and ** represents a two-dimensional convolution. All of the spatial coordinates and frequencies are measured in the plane of the sensor. note that $o(x,y)$ is not necessarily the original scene. It can contain terms to include a lens point spread function $h_H(x,y)$, optical prefiltering $b_H(x,y)$, or averaging over a sampling aperture rect($x$-/$a_H$, $y/b_H$):

$$o(x,y) = o'(x,y)  h_H(x,y)  b_H(x,y) ** \text{rect}(x/a_H, y/b_H) \quad (3)$$

where $o'(x,y)$ is the original scene. The expressions in equations (1) and (2) are, of course, nothing more than a sampled image. The regularly spaced sampling centers do not have to be located on a rectangular grid, and a hexagonal grid is often used. Sampling apertures other than a rectangle are also possible.

A more realistic halftoned image can be created by including a "sample and hold" in the display of this image. Each delta function is smeared out into a rectangular patch rect($x/a_D, y/b_D$). Instead of being an array of delta functions, the image is now an array of blocks, each block having a brightness corresponding to the value of a sample. The expressions for this image are $$i_H(x,y) = [o(x,y) \text{comb}(x/x_H, y/y_H) ** \text{rect}(x/a_D, y/b_D) \quad (4)$$

and $$I_H(\xi, \eta) = [O(\xi, \eta) ** \text{comb}(x_H\xi, Y_H\eta)] \text{sinc}(a_D\xi, b_D\eta) \quad (5)$$

The effect of this pixelation is to reduce, but not eliminate, the high spatial frequency content of the halftoned image. It is also possible to use interpolation functions other than the rect($x/a_D, y/b_D$) in the display of this image. The interpolation artifacts can be removed from the image by the proper choice of the display or interpolation function. In fact, if the scene is band-limited to a frequency less than the Nyquist frequency of the halftone process, the displayed image can be an exact replica of the scene. There would be no sampling artifacts---either aliasing or interpolation. However, the resulting continuous tone image could hardly be considered a halftone image.

DESCRIPTION OF THE DRAWINGS

The invention and its background are now described by reference to the accompanying drawings, of which:

FIG. 1 illustrates a one-dimensional thresholding process, including, in FIG. 1A, the screen function and input signal and, in FIG. 1B, the binary output;

BACKGROUND DISCUSSION

The usual method of producing a halftone image is to use a binary intensity pattern (i.e. black and white) and to obtain gray scale by varying the size of the dots--Spot Size Modulation. This is the type of coding used in most printing processes. An approximate expression to describe this image is $$i_H(x,y) = \sum_n \sum_m \text{rect}\{(x - nx_H)/\sqrt{o}\ (nx_H, my_H), \quad (6)$$

$$(y - my_H/\sqrt{o}\ (nx_H, my_H)\},$$

where o(x,y) can contain terms other than the original scene equation (3). Spot shapes other than a square can be used for dot formation, such as a rectangle with rounded corners. Because the scene information is encoded in the denominator of the rect function, this expression and this type of image are very difficult to handle analytically. The system is both nonlinear and shift-variant.

Even the above complicated expression is not a full description of the halftoning process as it is actually implemented. The procedure is to threshold the scene with a two-dimensional periodic screen function to produce a binary output. A one-dimensional example of this process is shown in FIG. 1. The important difference between halftoning and the usual threshold operation is that the threshold function, instead of being a constant level, is a spatially varying function. As described in equation (6), the size of the halftone dots that are produced is related to the local scene brightness, but in this case, the centers of the spots also shift to reflect the slope of the scene brightness. The shape of the dots can be modified by changing the thresholding screen function. The result of these nonlinear operations is that the halftoned image is capable of displaying information (without aliasing) at spatial frequencies greater than the Nyquist frequency corresponding to the period of the halftone screen. In this and all of the descriptions of a halftoned image, it is clear that in the spatial frequency representation, there is a strong component of image information at and around the screen frequency and its harmonics. The halftone image is not band-limited.

SAMPLING THE HALFTONE IMAGE

The severity of the problem in resampling a halftone image can be seen by considering a very simple scene--a uniform gray scene. The halftone image of this scene is a regular array of black dots on a white background. If this image is now resampled with a system that has a sampling frequency below the halftone frequency, the resulting final image will appear to have low frequency fringes running through it. These fringes result from the moire of the halftone dots with the sampling pattern. The artifacts arise only from the interaction of the two sampling operations. There is no scene contribution. It is the purpose of the present invention to prevent aliasing artifacts of this type from appearing in the final resampled image.

Figure 2A:
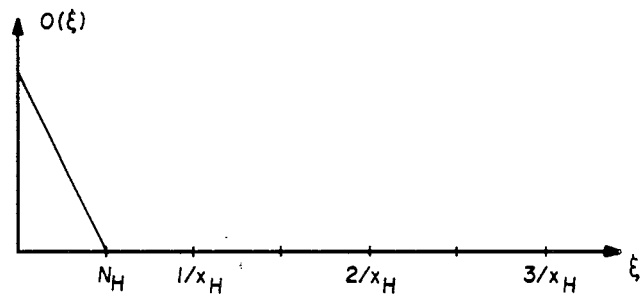
FIGS. 2A & 2B illustrates the spectra of the band-limited scene $o(\xi)$ and the halftoned image $I_H(\xi)$.
Figure 2B:
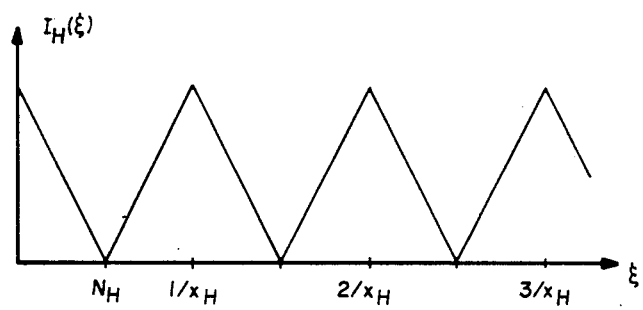

In order to simplify the analysis, the sampled image represented by equations (1) and (2) will be used as an example. In spite of this obvious simplification, a great deal can be learned about the resampling problem by this exercise. Since the major concern is the appearance of aliasing artifacts due to the halftoning process, not the scene information, a well behaved scene is chosen. The scene o(x,y) is chosen to be band-limited to a frequency below the Nyquist frequency of the halftoning process. The halftoned image is therefore reproduced without aliasing. The spectra for and the halftoned image are shown in FIGS. 2A & 2B. It is clear from these diagrams that there is more energy at high spatial frequencies in the halftoned image than in the scene because of the sampling/halftoning process. In fact, there are large concentrations of energy at and near all multiples of the halftone frequency. The scene spectrum is replicated at these frequencies. The situation described in this figure is slightly exaggerated because no display blur is included as in equation (5).

This sampled or halftoned image is now used as the input for a sampled or electronic imaging system. Allowing for the lens point spread function $h_S(x,y)$, an optical blur filter $b_S(x,y)$, and integration over a finite pixel size rect($x/a_S$, $y/b_S$), the final sampled (actually resampled) image can be written as $$i_S(x,y) = [i_H(x,y)  h_S(x,y)  b_S(x,y) ** \quad (7)$$

$$\text{rect}(x/a_S, y/b_S)]\text{comb}(x/x_S, y/y_S)$$

and $$I_S(\xi,\eta) = [I_H(\xi,\eta)H_S(\xi \cdot \eta)B_S(\xi,\eta)\text{sinc}(a_S\xi, b_S\eta)] ** \quad (8)$$

$$\text{comb}(x_S\xi, y_S\eta),$$

where $x_S$ and $y_S$ are the pixel spacings of the final imaging system. It is important to remember that there is no relationship between the sampling frequency of the halftone process and the sampling frequency of the electronic imaging system. Substituting equations (1) and (3) into equation (7) yields the final (and almost certainly uninterpretable) result:

$$i_S(x,y) = \{[(o'(x,y)  h_H(x,y)  b_H(x,y) ** \quad (9)$$

$$\text{rect}(x/a_H, y/b_H))\text{comb}(x/x_H, y/y_H)] **$$

$$h_S(x,y)  b_S(x,y)  \text{rect}(x/a_S, y/b_S)\}\text{comb}(x/x_S, y/y_S).$$

Returning to equation (7), a more useful expression can be found by making the substitution $$f_S(x,y) = h_S(x,y)  b_S(x,y)  \text{rect}(x/a_S, y/b_S), \quad (10)$$

and the simplified results are obtained:

$$i_S(x,y) = [i_H(x,y) ** f_S(x,y)]\text{comb}(x/x_S, y/y_S) \quad (11)$$
and
$$I_S(\xi,\eta) = [I_H\xi,\eta)F_S(\xi,\eta)] ** \text{comb}(x_S\xi, y_S\eta). \quad (12)$$

For no aliasing artifacts to appear in the final image, it is necessary that the spectrum of the product $I_H(\xi,\eta)F_S(\xi,\eta)$ be band-limited to a spatial frequency less than the Nyquist frequency of the final imaging system. Since the halftoned image is by nature not band-limited (see FIGS. 2A & 2B, some sort of prefiltering is necessary. This statement is also true for the other descriptions of a halftoned image (equations (1), (4) and (6)). The required filtering is accomplished by the blurring and averaging contained in $f_S(x,y)$. The term $F_S(\xi, \eta)$ serves as a spatial frequency net sampling prefilter or band-limiter for the halftone image.

The final image that is actually displayed would also contain a term to account for the final display blur $$i_F(x,y) = i_S(x,y) ** \text{rect}(x/a_F, y/b_F), \quad (13)$$

where a rectangle has arbitrarily been chosen as the blur function. While the choice of this term is important in producing an image that is pleasing to view, it does not greatly influence the aliasing artifact level in the image. It only reduces the interpolation artifacts in the image. Since both the useful image content and the aliasing artifacts occur at spatial frequencies below the Nyquist frequency of the final imaging system, any attempt to remove these artifacts from the image with the display blur will also significantly degrade and reduce the sharpness and resolution of the final image.

THE NET SAMPLING PREFILTER

It is appropriate at this point to discuss some of the practical constraints and limitations placed on the net sampling prefilter $F_S(\xi, \eta)$:

$$F_S(\xi,\eta) = H_S(\xi,\eta) B_S(\xi,\eta) \text{sinc}(a_S\xi, b_S\eta). \quad (14)$$

Figure 3:
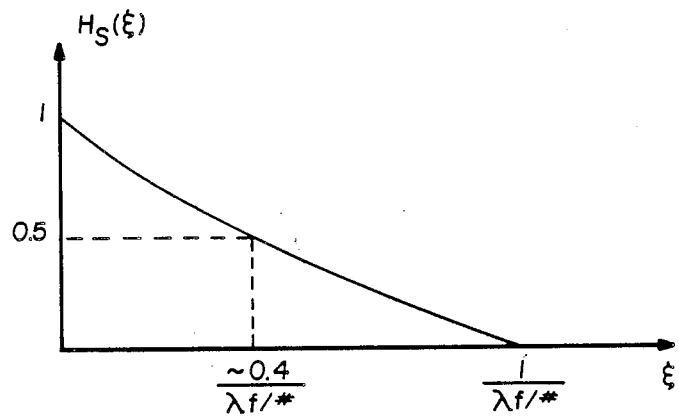
FIG. 3 illustrates the diffraction limited MTF of a lens with a working f-number of f/#.
Figure 4:
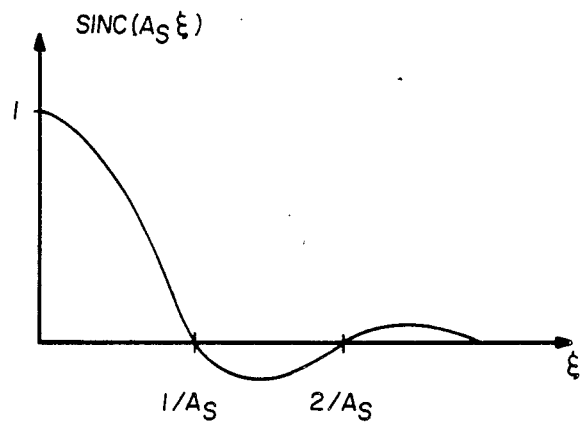
FIG. 4 illustrates the sinc function.

The first term $H_S(\xi,\eta)$ is the imaging lens modulation transfer function (MTF). While its form will vary, it must fall within an envelope defined by the diffraction-limited MTF of a lens with the same f-number (see FIG. 3). The actual MTF generally decreases from a maximum at zero spatial frequency, but it is common to have oscillations. This MTF is band-limited by diffraction to a spatial frequency of $1/(\#f/\#)$, where the f/# is the working f/# of the lens at the sensor. For an f/8 lens, this cut-off occurs at a frequency of about 250 lp/mm. By contrast, the Nyquist frequency of a sensor with a 10 μm pixel pitch is 50 lp/mm. The sinc function, which corresponds to the finite active area of the pixels on the sensor, is diagrammed in FIG. 4 and is oscillatory in nature. There are two basic types of optical prefiltering $b_S(x,y)$ that can be used. The first is to blur the image on the sensor by defocusing the lens. In this case, the blur MTF $B_S(\xi,\eta)$ is similar to a sinc function (actually, for a circular lens aperture, this function is often referred to as a Jsinc or Sombrero function). The other type of optical filtering is the use of a birefringent blur filter, which produces a blur point spread function (PSF) that is an array of two or more delta functions. The resulting blur MTF is a cosinusoid or a sum of cosinusoids. Most of the restrictions placed on the choice of the blur MTF come from the requirement that the blur PSF be a positive-only function--the light intensity patterns add.

Figure 5:
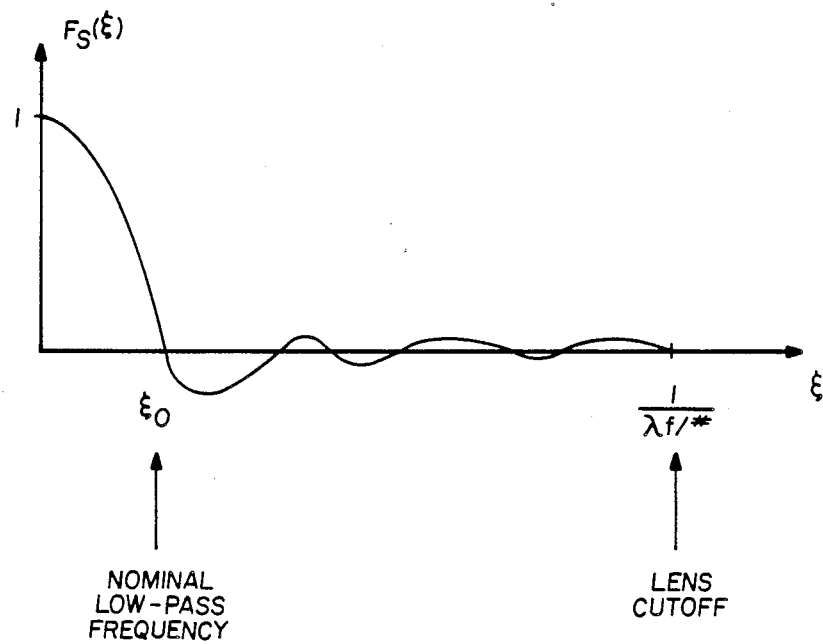
FIG. 5 illustrates a frequency domain representation of the net frequency filter $F_S(\xi)$.

With the above information, it is now possible to draw some conclusions about the net frequency filter $F_S(\xi,\eta)$. The optical filter combined with the pixel aperture can be chosen to produce an MTF that has a large central core with oscillating side-lobes. The cut-off frequency of this filter is usually considered to be at the first zero of the product, $\xi_0$ or $\eta_0$. While the wings on this filter may be small, they do exist and are not band-limited. The lens MTF does provide a firm cut-off, but it is usually at a spatial frequency several times the Nyquist frequency of the sensor. Because of light efficiency concerns, it is generally not possible to adjust the lens f-number to match the diffraction cut-off with the system Nyquist frequency. Even if this match is possible, it is probably not a good thing to do as the diffraction limited MTF falls off rapidly over spatial frequencies that are of interest, and significant image sharpness can be lost. It appears to be much better to use a "good" lens to image the scene and to perform low-pass filter operations with the optical prefilter and pixel aperture terms which can provide a sharper cut-off. A representation of the net frequency filter $F_S(\xi,\eta)$ is pictured in FIG. 5. It is not, in practice, possible to produce a true low-pass filter with a cut-off frequency below the diffraction limit of the lens. Some energy will be passed at spatial frequencies between the first zero of the filter and the lens cut-off.

THE DISPLAY BANDWIDTH

One additional set of spatial frequencies that must be defined are the maximum horizontal and vertical spatial frequencies that are needed for the display or that can be handled by the display—the display bandwidths $\xi_D$ and $\eta_D$. To avoid magnification factors, these spatial frequencies are also measured as they appear in the sensor plane.

When designing a sampled or electronic imaging system, the two important sets of parameters that must be determined are the sampling frequencies $1/x_S$, and $1/y_S$, and the nominal low-pass frequencies $\xi_0$ and $\eta_0$. In order to determine the relationship between these two sets of frequencies and the display bandwidths $\xi_D$ and $\eta_D$, it is interesting to consider three special cases of different halftone images and displays:

1) the halftone Nyquist frequencies $\frac{1}{2}x_H$ and $\frac{1}{2}y_H$ are much greater than the display bandwidths $\xi_D$ and $\eta_D$.
2) the halftone Nyquist frequencies $\frac{1}{2}x_H$ and $\frac{1}{2}y_H$ are much less than the display bandwidths $\xi_D$ and $\eta_D$.
3) the halftone Nyquist frequencies $\frac{1}{2}x_H$ and $\frac{1}{2}y_H$ and the display bandwidths $\xi_D$ and $\eta_D$ are comparable.

Of course, the third case is the one most commonly encountered and is the most interesting. To simplify the discussion, the above cases will be discussed in one dimension only, but the extension to two dimensions is straightforward.

Figure 6A:
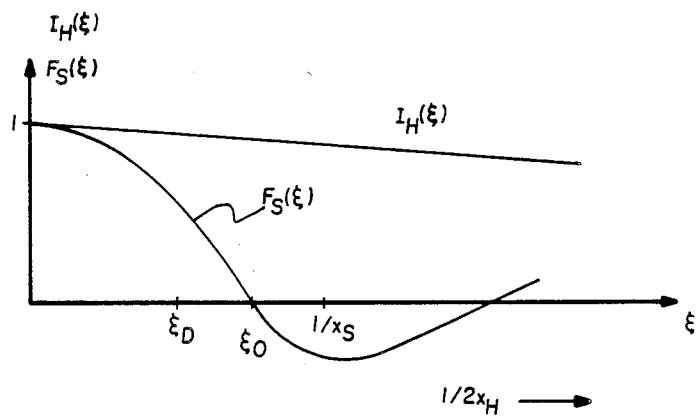
FIG. 6 illustrates the situation in which the halftone Nyquist frequency is much greater than the display bandwidth, including, in FIG. 6A, the halftone spectrum and the net filter function and in FIG. 6B, the spectrum of the resampled image showing the replicated sinc functions in which the sampling Nyquist frequency is equal to the display bandwidth.
Figure 6B:
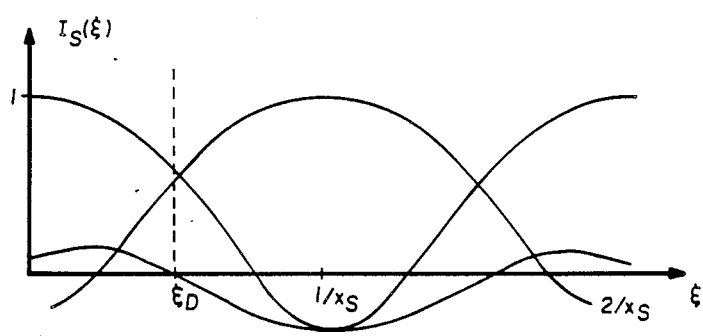

In the first case, where the halftone frequency is much larger than the display bandwidth, the halftone dots are not resolved or displayed, and the situation is very similar to sampling a scene that had not been previously halftoned. The Nyquist frequency of the sensor should therefore be chosen to be roughly equal to the display bandwidth $\xi_D$ (the sampling frequency $1/x_S$ should be twice the display bandwidth). The relative locations of these frequencies are diagrammed in FIG. 6. The overlap of the higher order curves at frequencies below the sensor Nyquist frequency indicates the potential for this system to experience aliasing. The choice of the low-pass filter cut-off involves the usual trade-off between aliasing and image sharpness, but in this case, it involves aliasing of the content of the original scene--not aliasing of the halftone dots. For pictorial scenes, the optimum trade-off generally places the first zero of the filter $\xi_0$ between the Nyquist frequency and the sampling frequency of the sensor. The situation depicted in FIG. 6 is probably more than acceptable for pictorial scenes.

The design rules for the second case are the same as for the first case. Here, however, the halftone dots are large and are easily resolved by the image sensor. The reproduced image must therefore contain replicas of the dots, as the dots have become valid scene content. The sharpness/aliasing trade-off exists here also, but it primarily involves how well the halftone dots are reproduced. It is unlikely that any aliasing artifacts are introduced by the high-order harmonics of the halftone frequency.

The third case, where the halftone dots are just resolved or are just not resolved by the display, poses the biggest threat for the design of a system that is plagued by resampling artifacts. The above-cited publication by Chao indicate that three basic methods exist for scanning a halftone image, and that each has serious drawbacks:

The first is to scan the image at a sufficiently high resolution that the halftone dots are resolved. A scan frequency of six to eight or more times the halftone frequency is required. Computer algorithms can then be used to infer the original scene from the dot size and location. This method requires that the halftone frequency be known to set the sampling frequency. However, since the scan frequency is determined by the hardware configuration, a fixed scan frequency must be used for all scenes. This method also collects far more data than is needed for the display.

The second is to choose the scan direction relative to the screen direction so that artifacts are minimized. This procedure requires knowledge of the screen orientation and is very sensitive to small alignment errors.

The third is to low-pass filter the image before scanning to remove the higher frequency components of the image and leave only the original spectrum of the scene. In this method, the quality of the image can be severely degraded because the halftone can contain information at frequencies higher than the screen Nyquist frequency. When the halftone image is low-pass filtered to remove the screen structure, it is likely that scene information is lost.

None of these procedures implemented individually are likely to provide a workable system.

SUMMARY OF THE INVENTION

A new methodology is needed to scan a previously halftoned image that is based on the system requirements, not the particular image being scanned. Simply stated, the system requirements are to preserve the scene detail out to the resolution limit of the display, to do this without introducing artifacts into the final image, and to minimize the amount of data that is required. The scene detail includes any portions of the spectrum of the halftone image, including the halftone dots, that occur within the display bandwidth.

Very briefly, the system in this invention first generates a low-pass filtered oversampled scan whose parameters are based upon the desired display requirements, and follows this operation by a further digital low-pass filter and a reduction in the amount of data (resampling) to produce the final sampled image.

More precisely, the process of the invention for scanning images that may have been previously sampled or halftoned is as follows:

1) Determine the necessary display bandwidth or resolutions $\xi_D$ and $\eta_D$ for the application.
2) Use a filter function $FS(\xi, \eta)$ to low-pass filter the image before it is scanned. The components of this filter are the lens MTF, the optical prefilter, and the active area of each pixel. A suggested starting point is to choose the nominal low-pass frequencies $\xi_0$ and $\eta_0$ to be one and a half times the display resolutions $\xi_D$ and $\eta_D$.
3) Scan the low-pass filtered image with an electronic sensor. Use an oversampling scheme where the sample frequencies $1/x_s$ and $1/y_s$ are four to six times the display bandwidths $\xi_D$ and $\eta_D$ (so that the sampling Nyquist frequencies are two to three times the display bandwidths).
4) Immediately perform an electronic low-pass filtering/resampling operation on this oversampled image to reduce the amount of data per image.
5) After any application-related signal processing is done to the image, display the image with a suitable interpolation function to remove pixelation errors.

The process of the invention provides significantly reduced susceptibility to aliasing artifacts caused by the presence of previously sampled images in the input, while preserving image sharpness out to the limit of the resolution of the display.

ANALYTICAL DISCUSSION OF THE INVENTION

Since the bandwidth of the display $\xi_D$ is known, it is reasonable that the halftone image can be low-pass filtered to approximately this same frequency without loss of information. As in the cases where there is a large mismatch between the display bandwidth and the halftone Nyquist frequency, the nominal cut-off frequency $\xi_0$ of the net filter function should probably be chosen to be larger than the display bandwidth to preserve image sharpness out to the limit of the display resolution. A good starting point is for the cut-off frequency $\xi_0$ to be about one and a half times the display bandwidth $\xi_D$. The resulting filtered scene spectrum (using the scene in FIGS. 2A & 2B is shown in FIG. 7.

This is the point where the strategy of sampling a halftone image differs from that of sampling a pictorial scene or the two cases described above where there is a large mismatch between the display and halftone frequencies. When aliasing occurs in the scene content in an image, it normally occurs in an isolated section of the picture—a picket fence for example. While these artifacts are distracting to the viewer, they are localized and the image is still usable. If, however, the dots in a halftone image alias, a moire pattern over the entire image is likely to result, and the utility of the resulting image is questionable. It will certainly look awful. The sampling frequency must be chosen to avoid this situation.

Figure 7:
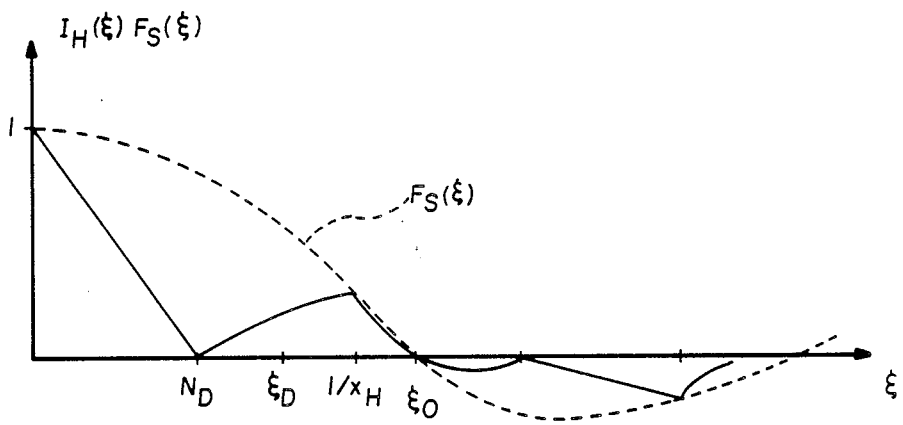
FIG. 7 illustrates the low-pass filtered scene spectrum when the halftone Nyquist frequency is approximately equal to the display bandwidth.
Figure 8:
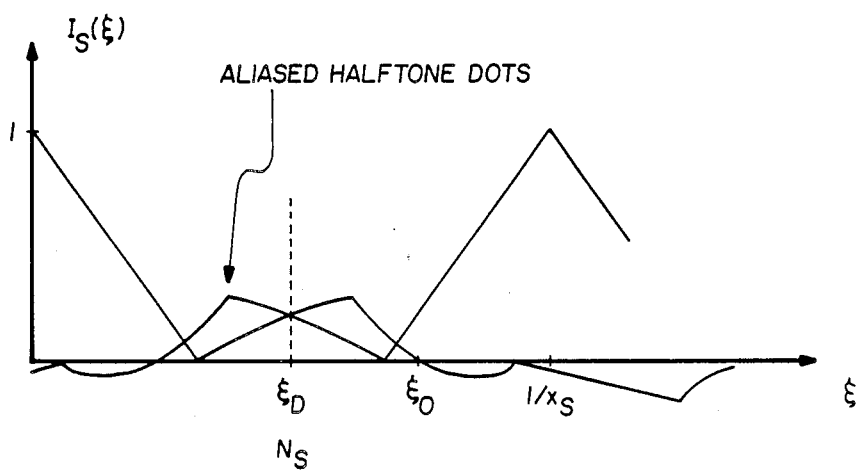
FIG. 8 illustrates the spectrum of the resampled image with the sampling Nyquist frequency equal to the display bandwidth, in which only the first-order replica is shown.

As a first example, consider the situation where the filtered scene in FIG. 7 is sampled at a frequency of roughly twice the display bandwidth (the sampling Nyquist frequency is at the limiting display frequency). This situation is depicted in FIG. 8. The slow roll-off of the low-pass filter allows some of the scene information at the harmonics of the halftone frequency to be replicated into the display passband. Even if the Nyquist frequency is chosen to be the nominal low-pass frequency, the situation is the same because of the oscillating side lobes of the filter function $F_S(\xi,\eta)$. It is now clear that since a sharp-cutting, low-pass filter cannot be produced, the halftone image must be oversampled to prevent these types of aliasing errors. In other words, it appears to be very important that any components of the filtered halftone image at frequencies above the display bandwidth, especially those at the halftone frequency and its first two or three harmonics, are not mapped back into the display bandwidth by the sampling operation.

Figure 9:
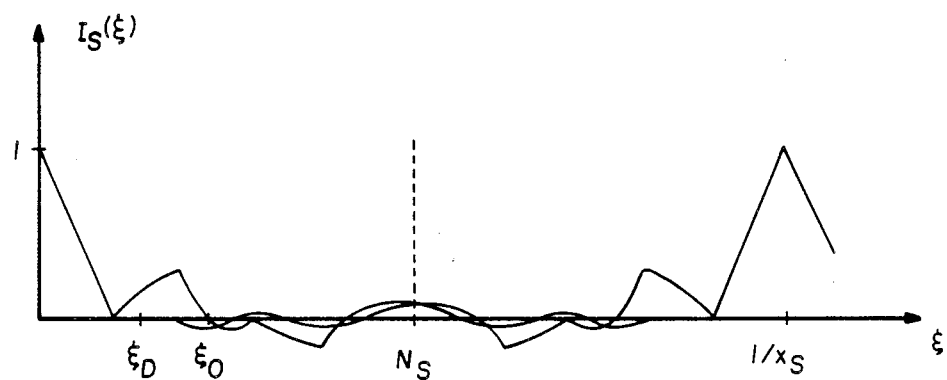
FIG. 9 illustrates the spectrum of the sampled image with three times oversampling, in which the aliased signal is moved to spatial frequencies beyond the display bandwidth.

The next parameter is the degree of oversampling that is required to prevent the appearance of a moire between the halftone dots and the sampling array in the final displayed image. While it is impossible to determine this rate exactly without knowledge of the particular situation and experimentation, it is possible to hypothesize that two or three time oversampling may be sufficient. The sampling Nyquist frequency $\frac{1}{2}x_S$ should be two or three times the display bandwidth $\xi_D$. The case of three times oversampling is shown in FIG. 9. Note that the halftone image still aliases due to the "leaky" low-pass filter, but these aliasing artifacts mostly fall harmlessly at spatial frequencies between the display bandwidth and the sampling Nyquist frequency--out of the range of interest. Only very high-frequency portions of the halftone spectrum (multiplied by the low-pass filter) have the potential to map back into the display bandwidth and appear in the final displayed image. Depending on the individual system, the sampling frequency and the nominal low-pass filter frequency will have to be optimized. The aliased signals outside of the display bandwidth are automatically removed by the display or can be electronically filtered.

THE FILTERING/RESAMPLING OPERATION

Figure 10A:
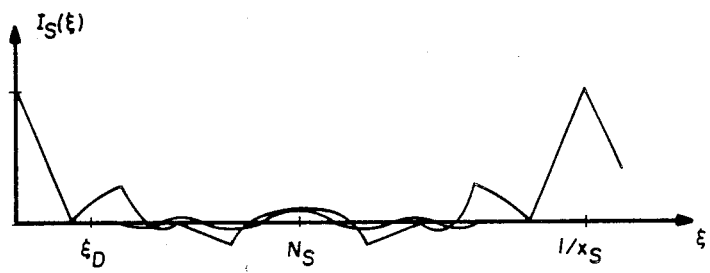
FIG. 10 illustrates the frequency space representation of the low-pass filter/resampling operation, including, in FIG. 10A, the original resampled image, in FIG. 10B, after the low-pass filter and in FIG. 10C, after resampling at the final sampling frequency $1/x'_s$.
Figure 10B:
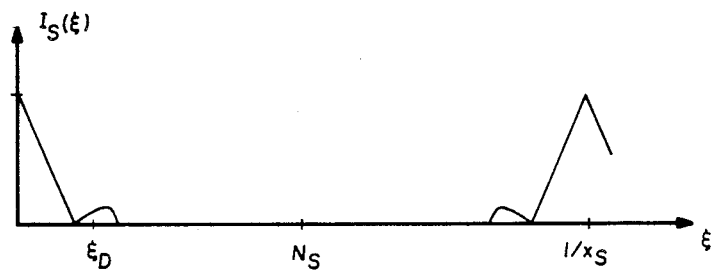
Figure 10C:
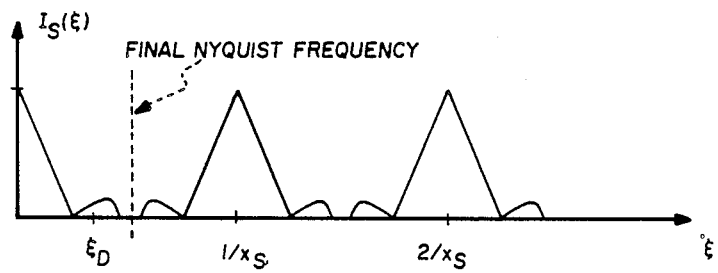

The resampled image that has just been produced, while it may be free of aliasing artifacts, contains four to nine times more pixels than the display is capable of using (two or three times more in each dimension). This extra data must never be stored, or worse yet, transmitted to another location. The system size, electronic bandwidths, and cost expand greatly if these extra pixels are used. The first signal processing the output of the scanning sensor should enter is a low-pass filter/resampling module. The electronic or digital filter reduces the bandwidth of the signal to approximately the display bandwidth from a bandwidth equal to the Nyquist frequency of the sensor, and the resampling operation reduces the number of pixels in the image to something more appropriate for the display bandwidth. The frequency space representation of these operations is given in FIG. 10. The original resampled image spectrum consists of widely separated, narrow bands of scene information with undesirable or aliased signals in between. The low-pass filter cleans out the space between the scene information, and the resampling procedure eliminates the now empty bands of frequency space by repacking the image spectra closer together—a lower final sampling frequency $1/x_S'$ and the correct amount of data. Depending on the method of implementation, these steps may occur in a single operation.

The final filtering/resampling operation to produce the final ("resampled") image is necessary due to the limitations on the prefilter $F_S(\xi,\eta)$. A better low-pass filter can be generated electronically than optically because negative voltages and currents exist while negative intensities do not. In fact, the filtering/resampling operation would not be necessary if an ideal square cut-off optical filter existed. It is important to realize that the filtering/resampling operation is not just a simple averaging of adjacent pixels—this would be equivalent to sampling the halftone at a lower sampling frequency, and defeats the oversampling that has already been done. In the simplest embodiment, this operation will consist of a moving finite impulse response digital filter of the type well-known in the art (requiring several lines of image storage at the oversampling rate). In a more complex embodiment, it would consist of a two-dimensional fast Fourier transform of the entire image (requiring a full frame store at the oversampling rate). The resampling conversion is probably most easily obtained in a digital system by choosing the scanning sampling frequency to be an integer number (i.e. 2 or 3) times the final display sample frequency. For raster scanned displays or displays with discrete pixels, the final sampling frequency should equal the display rate, or a further resampling will be necessary.

While it may seem that this resampling operation could be considered a data compression technique, it is not. It is part of the overall process to eliminate aliasing artifacts due to the halftone dots and is the opposite operation to the oversampling that is required at an earlier stage of the process. The final image that results from this system can be stored and transmitted with available data compression techniques.

The quality of the final image depends on the amount of interpolation error in it. The display blur, which is obviously coupled to the display bandwidth and resolution, should be chosen to minimize the blockiness or pixelation in the final image.

The process that has just been described preferably resamples a halftone image where the halftone frequency and the display resolution are comparable. Non-halftone images and images with a large mismatch of these frequencies do not require the added aliasing suppression provided by this procedure, but if it is used on them, no degradation should result. Similarly, the procedure should also work for continuous-tone originals. Care should be taken to maintain the system MTF below the display resolution at the highest possible level. All information in the image being sampled, whether previously sampled or not, should be displayed in the final image if it occurs within the bandwidth of the display.

DESCRIPTION OF THE PREFERRED EMBODIMENT

Figure 11:
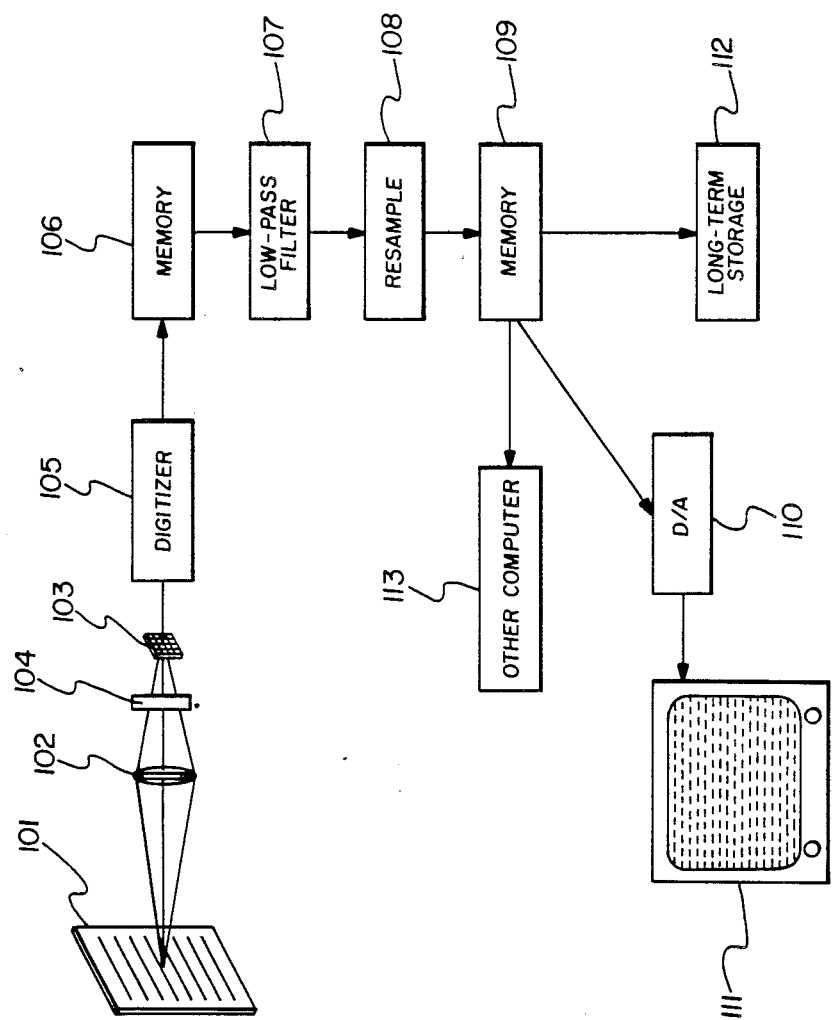
FIG. 11 is a simplified schematic block diagram illustrating a preferred embodiment of a system embodying the invention.

A preferred embodiment of the system of this invention for processing an image signal in accordance with the above-described process is shown in FIG. 11. An original image or document which may contain a halftone pattern (101) is imaged by a lens (102) onto a two-dimensional CCD array (103). A birefringent blur filter (104) is used to low-pass filter the optical signal on the sensor to bandwidths of approximately 1.5 times the desired display resolutions. The sampling frequencies (1/pixel pitch in each direction--horizontal and vertical) of the CCD array (103) are chosen to be 4-6 times these display bandwidths. The signal from the sensor is an optically filtered oversampled representation of the input image (101). This oversampled image is then digitized (105) and stored in a digital memory (106). In the oversampled image, the aliasing between the frequency of the halftone pattern and the sampling frequencies of the array (103) is shifted to frequencies higher than the horizontal and vertical resolutions of the display. Accordingly, such aliasing is easily filtered out without affecting signals within the display resolution. At this point, this stored image is digitally low-pass filtered (107) to further reduce the amount of scene content occurring at frequencies above the display frequencies. Thus, the cut-off frequency of the low-pass filter (107) should be approximately equal to the display resolution for each direction. This operation is most likely performed by a moving finite impulse response (FIR) filter. Immediately after storage and certainly before long-term image storage, the resulting oversampled filtered image is resampled (108) to a lower sampling frequency to reduce the amount of data per image. The final Nyquist frequencies—or twice the lower sampling frequency—should equal or slightly exceed the display bandwidth requirements. This image is stored in memory (109). There are several options available from this point. The first involves converting the image into an analog signal with a digital to analog converter (110) and displaying this signal on a video monitor or display (111). The second option involves transferring the data to long-term storage (112) on a media such as optical disk or magnetic tape or disk. The third option is to transfer the image in either digital or analog form to a remote computer or display (113). The speed and complexity of all of these options have been improved by matching the amount of data in the final sampled image to that required by the final application or display.

It should be clear that there are many possible variations of this system. Any of the many possible input scanners can be used (linear CCD's, laser scanners, flying spot scanners, etc.), and other filtering schemes, both optical and digital, also exist. It is also possible to combine the high-density memory 106, digital low-pass filter 107 and resampling 108 into a single operation in a dedicated logic circuit or in a programmed microprocessor. This would require only a few lines of high-density memory and would be done on the fly as the signals are read off the sensor. This combination would eliminate the need for the entire high-density memory. Any number of types of output displays are possible, including hardcopy output in the form of either continuous-tone images or images that have been re-halftoned.

Applications

This invention will have many and varied applications. Some of these include scanning of paper and microfilmed images for digital storage and transmission, input scanning for digital-xerographic processes, input scanning for lithographic and printing applications, scanning for facsimile transmission (FAX), and scanning for computer document composition and layout.

While the invention has been described in detail by reference to a preferred embodiment thereof, it is understood that variations and modifications thereof may be made without departing from the true spirit and scope of the invention.

What is claimed is:

1. A method of displaying on a medium characterized by horizontal and vertical spatial resolutions $r_{dx}$ and $r_{dy}$ a halftoned image characterized by a half-tone frequency $f_h$, comprising:

low-pass filtering said image with respective horizontal and vertical low pass frequency $f_x$ and $f_y$ which are equal to or greater than said horizontal and vertical display resolutions $r_{dx}$ and $r_{dy}$, respectively, and less than either the second or third harmonics of said halftone frequency $f_h$, so as to generate a prefiltered image;

sampling said prefiltered image at respective horizontal and vertical sampling frequencies $f_{sx}$ and $f_{sy}$ which are between four and six times said horizontal and vertical display resolutions $r_x$ and $r_{dy}$, respectively, so as to generate an oversampled image;

low-pass filtering said oversampling image with respective horizontal and vertical low-pass frequencies $F_x$ and $F_y$ equal to or greater than said horizontal and vertical display resolutions $r_{dx}$ and $r_{dy}$, respectively to produce an output image; and resampling said output image at horizontal and vertical spatial Nyguist sampling frequencies slightly in excess of said horizontal and vertical display resolutions $r_{dx}$ and $r_{dy}$, respectively so as to generate a display signal, and transmitting said display signal to said medium.

2. A system for displaying on a medium characterized by horizontal and vertical spatial resolutions $r_{dx}$ and $r_{dy}$ a halftoned image characterized by a half-tone frequency $f_h$, comprising:

means for low-pass filtering said image with respective horizontal and vertical low pass frequencies $f_x$ and $f_y$ which are equal to or greater than said horizontal and vertical display resolutions $r_{dx}$ and $r_{dy}$, respectively, and less than either and the second or third harmonics of said halftone frequency $f_h$, so as to generate a prefiltered image;

means for sampling said prefiltered image at respective horizontal and vertical sampling frequencies $f_{sx}$ and $f_{sy}$ which are between four and six times said horizontal and vertical display resolutions $r_{dx}$ and $r_{dy}$, respectively, so as to generate an oversampled image;

means for low-pass filtering said oversampled image with respective horizontal and vertical low-pass frequencies $F_x$ and $F_y$ to or greater than said horizontal and vertical display resolutions $r_{dx}$ and $r_{dy}$, respectively to produce an output image; and means for resampling said output image at horizontal and vertical spatial Nyquist sampling frequencies slightly in excess of said horizontal and vertical display resolutions $r_{dx}$ and $r_{dy}$, respectively, so as to generate a display image, and transmitting said display image to said medium.

3. The system of claim 2 wherein said means for low pass filtering said image comprises a blur filter, said means for sampling said prefiltered image comprise an imager array, said means for low-pass filtering said oversampled image comprise a finite impulse response filter.

4. A method of displaying on a medium characterized by horizontal and vertical spatial resolutions $r_{dx}$ and $r_{dy}$ a halftoned image characterized by a half-tone frequency $f_h$, comprising:

sampling with initial horizontal and vertical sampling frequencies and low-pass filtering said image with respective horizontal and vertical low pass frequencies $f_x$ and $f_y$ which are equal to or greater than said horizontal and vertical display resolutions $r_{dx}$ and $r_{dy}$, respectively, and less than either the second or third harmonics of said halftone frequency $f_h$, so as to generate a prefiltered image having aliasing frequencies corresponding to an interaction between said halftone frequency and said initial sampling frequencies, said sampling of said prefiltered image being at respective horizontal and vertical oversampling frequencies $f_{sx}$ and $f_{sy}$, so as to generate an oversampled image, said oversampling frequencies being such that said aliasing frequencies are increased in said oversampled image so as to be greater than the respective ones of said display resolutions;

filtering said oversampled image with respective horizontal and vertical low pass frequencies $F_x$ and $F_y$ less than the respective ones of said aliasing frequencies in said oversampled image, to produce an output image; and resampling said output image at horizontal and vertical spatial Nyquist sampling frequencies slightly in excess of said horizontal and vertical display resolutions $r_{dx}$ and $r_{dy}$, respectively so as to generate a display signal, and transmitting said display signal to said medium.

5. The method of claim 4 wherein said oversampling frequencies are four to six times the corresponding ones of said spatial display resolutions.

* * * * *

UNITED STATES PATENT AND TRADEMARK OFFICE
CERTIFICATE OF CORRECTION

PATENT NO. : 4,987,496

DATED : January 22, 1991

INVENTOR(S) : John E. Greivenkamp, Jr.

It is certified that error appears in the above-identified patent and that said Letters Patent is hereby corrected as shown below:

Column 1, line 34, delete "." after "Engineering" and insert ",".

Column 1, line 54, insert "(" after "comb"

Column 1, line 61 delete "n" and insert "N"

Column 4, line 8, insert "both the scene" after "for"

Column 4, line 31, delete "." and insert ","

Column 4, line 50, delete "1" between "y" and "/"

Column5, line 31, delete "#" between "(" and "f" and insert "2"

Column 6, line 28, delete "1/2" and insert "$\xi$"

Column 7, line 10, insert "--" before paragraph

Column 7, line 23, insert "--" before paragraph

Column 11, line 67, insert subscript "d" between "r" and "x"

Column 12, line 7, delete "Nyguist" and insert "Nyquist"

UNITED STATES PATENT AND TRADEMARK OFFICE
CERTIFICATE OF CORRECTION

PATENT NO. : 4,987,496

DATED : January 22, 1991

INVENTOR(S) : John E. Greivenkamp, Jr.

It is certified that error appears in the above-identified patent and that said Letters Patent is hereby corrected as shown below:

Column 12, line 32, insert "equal" between "fy" and "to".

Signed and Sealed this

Fourth Day of May, 1993

Attest:

MICHAEL K. KIRK

Attesting Officer

Acting Commissioner of Patents and Trademarks